United States Patent

Tu

[11] Patent Number: 5,542,773
[45] Date of Patent: Aug. 6, 1996

[54] SECURE SCREW BUSH TYPE DRAG-LINK MOVABLE POSITIONING STRUCTURE

[76] Inventor: A-Shih Tu, P.O. Box 96-173, Taipei, Taiwan

[21] Appl. No.: 201,017

[22] Filed: Feb. 24, 1994

[51] Int. Cl.⁶ ........................................ F16B 7/10
[52] U.S. Cl. ..................... 403/109; 403/377; 403/366; 403/362
[58] Field of Search ..................... 403/109, 377, 403/104, 110, 373, 374, 362, 366, 365; 280/47.315, 47.371, 655, 655.1; 190/18 A

[56] References Cited

U.S. PATENT DOCUMENTS

| | | | |
|---|---|---|---|
| 3,604,734 | 9/1971 | Friedman | 403/104 |
| 3,955,828 | 5/1976 | Boudreau | 403/362 X |
| 4,140,415 | 2/1979 | Koyamato | 403/104 |
| 4,587,864 | 5/1986 | Kassai | 280/47.371 X |
| 4,818,135 | 4/1989 | Desjardins | 403/104 |
| 4,896,897 | 1/1990 | Wilhelm | 280/655 |
| 4,950,003 | 8/1990 | Holtz | 280/47.315 X |
| 5,257,800 | 11/1993 | Yang | 280/655 X |

FOREIGN PATENT DOCUMENTS

| | | | |
|---|---|---|---|
| 1454739 | 1/1989 | U.S.S.R. | 403/104 |

Primary Examiner—Kenneth J. Dorner
Assistant Examiner—Harry C. Kim
Attorney, Agent, or Firm—Bacon & Thomas

[57] ABSTRACT

A secure screw locking structure for a telescoping drag link and fixing rod. When used in a luggage handle, it includes a pair of symmetrical drag links and fixing rods, a loop bar or insert and a setting seat or coupling, a screw block seat or hub and a control screw bush or knob located on each end of a transverse fixing seat or cross bar. The coupling has a setting hole or axial bore and a screw block seat or hub. The axial bore receives the outer end of the fixing rod; the fixing rod receives a hollow loop bar or insert having an integral leaf spring and bore and a limiting ring block or annular flange holding the insert in position in the coupling bore; and the insert receives the drag link. The control knob can be screwed into the thread hole of the hub and a locking block or retaining member forced by a screw block or tab of the knob when screwed in. Then the drag link can be held firmly in place by the spring pushed into engagement by a pin mounted in the knob. The control knob is retained firmly on the hub.

5 Claims, 6 Drawing Sheets

SECURE SCREW BUSH TYPE DRAG-LINK MOVABLE POSITIONING STRUCTURE

FIELD OF THE INVENTION

The present invention relates to a secure screw bush type drag link movable positioning structure, and particularly to a random-positioning drag link structure.

BACKGROUND OF THE INVENTION

The conventional drag link suitcase has been widely used in for example a flight passenger suitcase and a heavy-goods carriage suitcase. With an extensible drag link, a suitcase can be transported in a labor-saving manner by being pulled and the space it occupies can be flexible subject to the need. However, the conventional drag link can be extensible only to its fullest length within the outer link without any capability of an intermediate positioning. Because of this there may be a problem in use if the drag link was partially closed within the outer link due to a mistake. Some improvement has been made by means of a conic retaining block located at the end of the inner link in order to retain it in position as soon as the drag link is pulled out. However, when the inner link is to be reinserted, the user has to use a large force to push down the puller to move the retaining block from its retaining position. This not only results in pain to the hand and inconvenience of operation, but also shortens the life of the drag link due to more wear and retaining strength damage. Therefore, it is obvious that the conventional drag link has such defects as a poor effective positioning and poor performance of use.

SUMMARY OF THE INVENTION

In a drag link according to the present invention through the control of a screw knob and a pin, a leaf spring can be controlled to retain or release a drag link or upper tubular leg from a fixing rod or lower tubular member whereby the drag link can be extended or inserted into the fixing rod and positioned at any length desired by the user. The nonslippage of the drag link when in use provides a reliable performance.

The present invention provides a quickly assembled structure that when in use provides a secure positioning without a risk of slippage during use. The two telescoping members can be locked together at any relative position.

DETAILED DESCRIPTION OF THE PREFERRED EMBODIMENT

Figure 1:
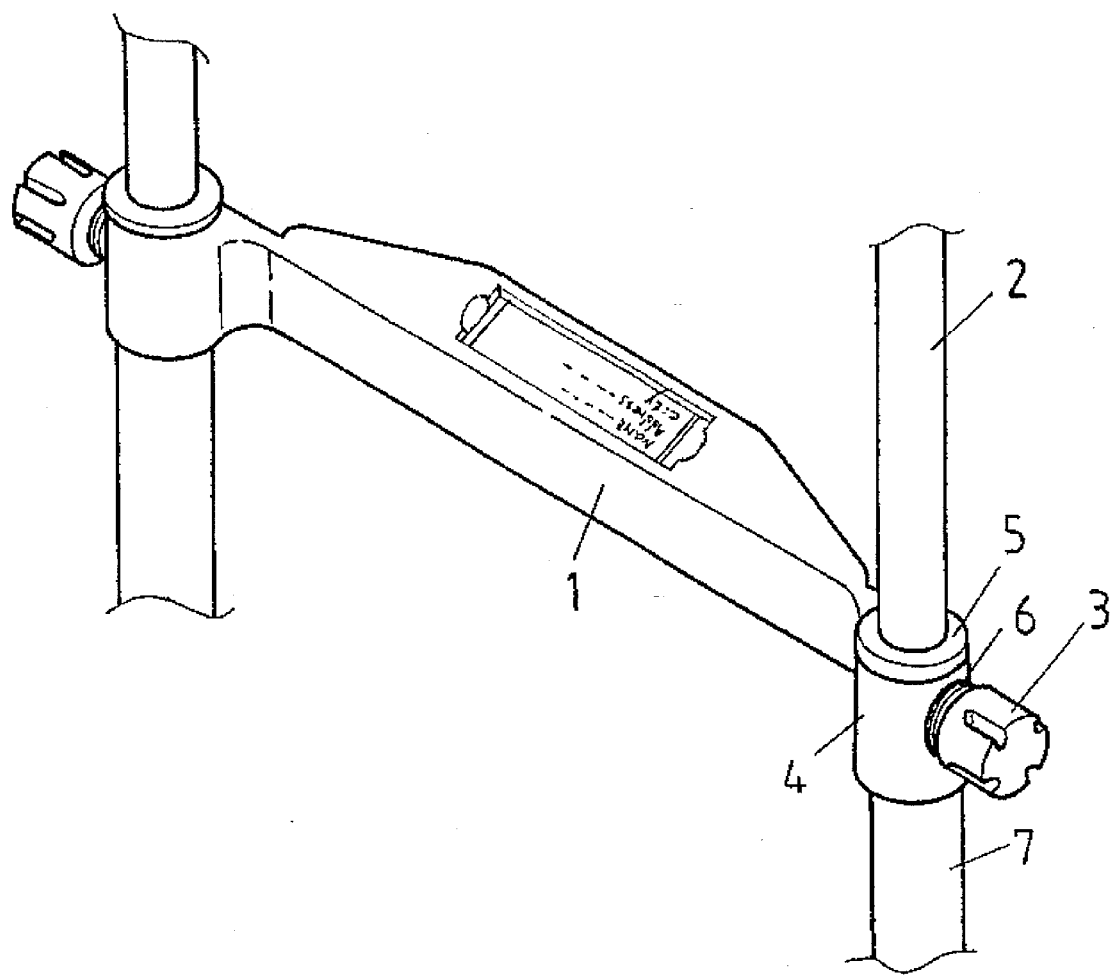
FIG. 1 is a perspective view showing the present invention.
Figure 2:
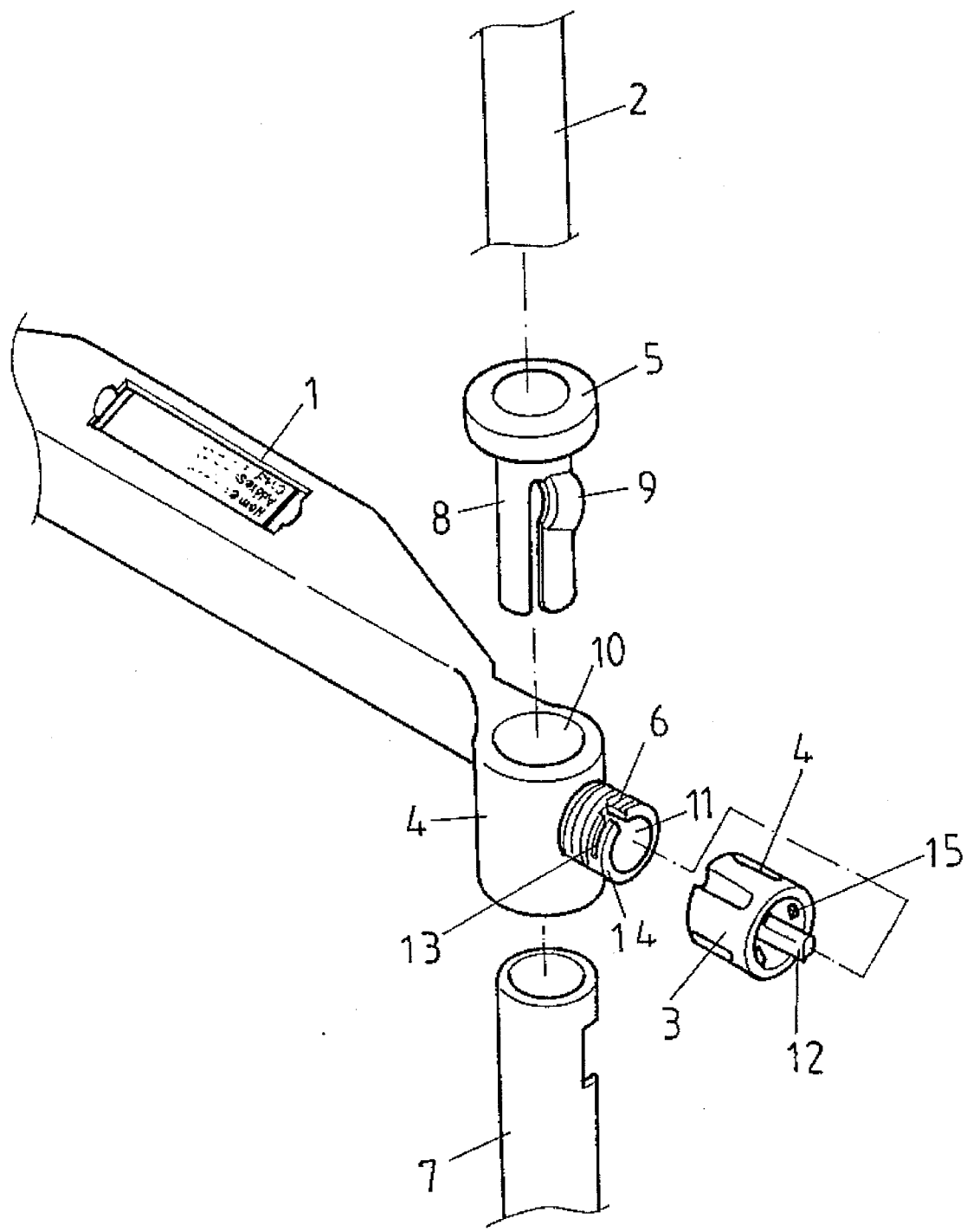
FIG. 2 is an exploded perspective view of the present invention.

Referring to FIGS. 1 and 2, the present invention comprises symmetrical drag links or tubing 2, to control screw bushes or knobs 3, hollow, tubular setting seats or mounting couplings 4, screw block seats or hubs 6, hollow fixing rods or lower tubular members 7, loop bars or hollow inserts 8, having a fixing seat or cross bar 1.

Drag links 2 have a hollow cylindrical body and are telescopingly mounted inside hollow tubular members 7.

Control screw knob 3 has an internal cavity and accommodates a projecting forced lever or pin 12 coaxially mounted therein. Control screw bush 3 has a screw or thread block or tab 15 that extends into its internal cavity.

Setting seats 4 are mounted on the two ends of fixing seat 1. The external side of said setting seats 4 has screw block seats 6, and the external part of screw block seats 6 with ring threads and the front has a loose-preventing or locking block or retaining member 14 and internal thread hole 11 to form a notch type retaining slot 13.

Loop bar 8 has a limiting ring block or annular flange 5 on the top and on the side a notch having a short hollow stem body with a "U" shape type compression resilience or leaf spring 9;

the aforesaid components are thus assembled as such: the setting hole or bore 10 on the setting seat 4 of fixing seat 1 is downwardly set into the fixing rod 7.

Then a loop bar 8 with its spring 9 is set into the setting hole 10 until limiting ring block 5 engages the top of setting seat 4. The length of loop bar 8 is such that spring 9 is located just at the distal end of a thread hole or threaded bore 11 of the screw block seat 6. Drag link 2 is then inserted in said limiting ring block 5 and loop bar 8, and drag link 2, loop bar 8, setting seat 4 and fixing rod 7 are assembled together. Then control screw bush 3 with the screw block or tab 15 is screwed into the retaining slot 13 for retaining the locking block 14 of screw block seat 6. Continued screwing of control screw bush 3 forces forced lever 12 into the thread hole 11 and into contact with spring 9 without a risk of breakage. Therefore an easy and quick assembly of a screw bush type drag link movable positioning structure is achieved.

Figure 3A:
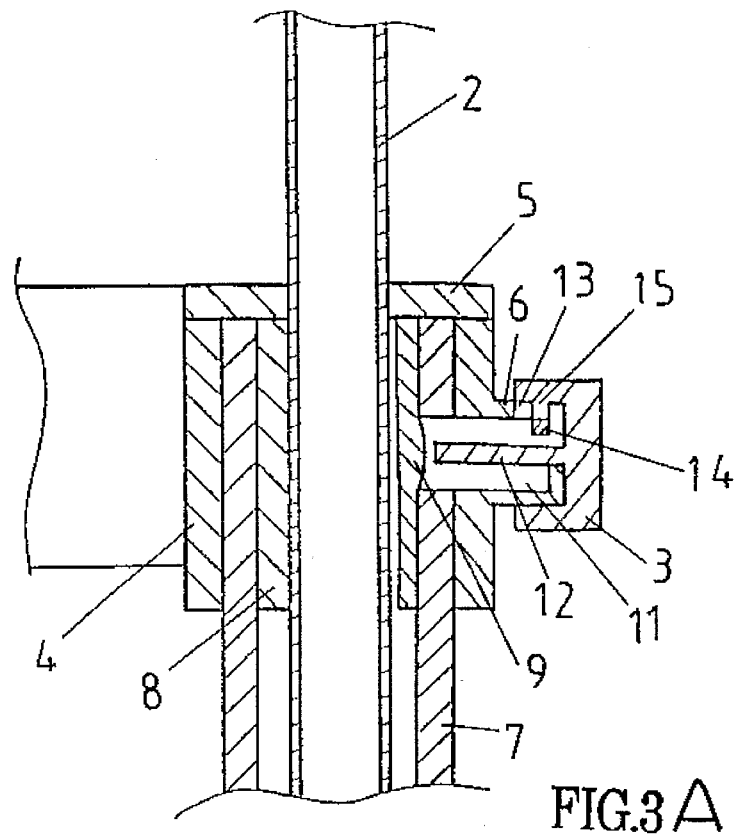
FIGS. 3A and 3B are a cross-sectional view showing the action of the present invention.
Figure 3B:
Figure 3B:
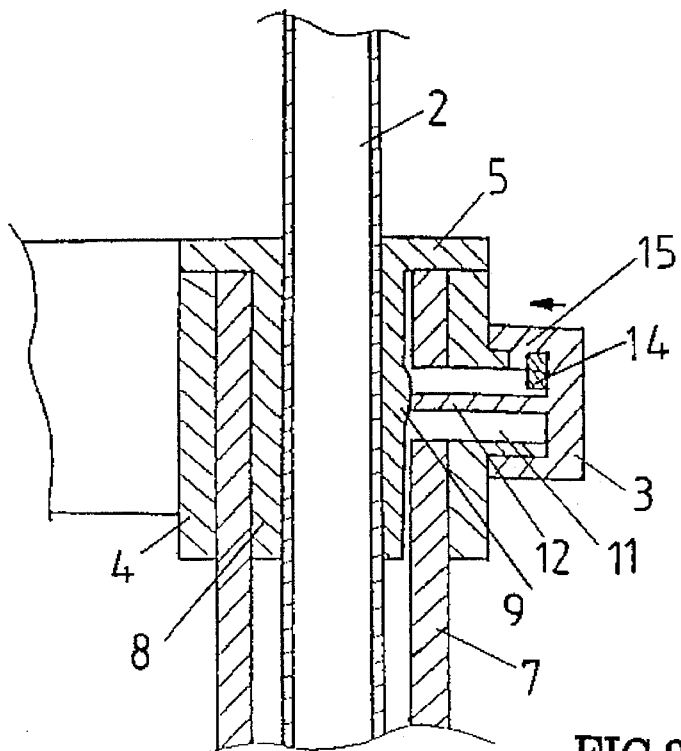
Figure 4:
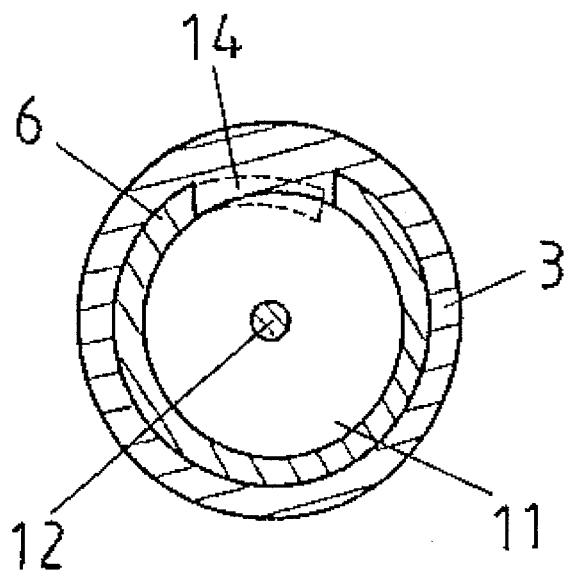
FIGS. 4A and 4B are a cross-sectional view of a first embodiment showing the action of the present invention to control the screw bush.
Figure 4:
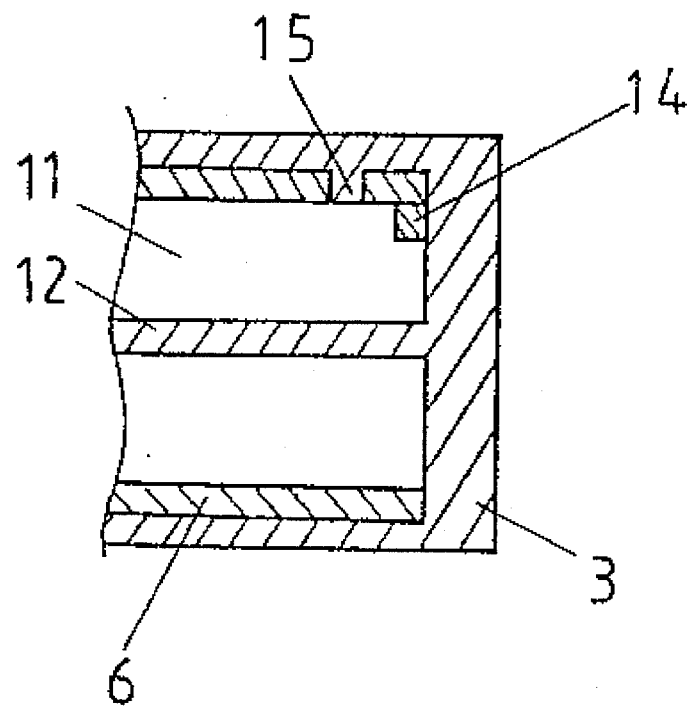

Referring to FIGS. 3A, 3B in company with FIGS. 4A and 4B, when it is desired to pull out or push in the drag link 2, the control screw bush 3 is unscrewed to release or to cause the forced lever 12 out of engagement with spring 9 so that spring 9 is released to allow the drag link 2 to become freely extensible within the fixing rod 7. When the drag link 2 has been appropriately positioned as intended control screw bush 3 is screwed in to cause its thread block 15 to disengage from locking block 14 on the screw block seat 6. Continued screwing of control screw bush 3 causes thread block 15 to move forward along against the locking block 14 and along the way of the threads so as to cause the locking block 14 gradually producing compression with slight elastic transformation which enables the screw block 15 to move forward and screw into the retaining slot 13 to cause the locking block 14 limiting the thread block 15 in position without risk of slipping backward and falling off or breaking away. Forced lever 12 can therefore be actuated in accordance with the control screw bush 3 for forcibly compressing the compression resilience 9 by means of the thread hole 11 to cause the compression spring 8 to engage and retain the drag link 2. This permits the secure positioning of the drag link 2 securely at a random position without a risk of slippage during use.

Figure 5:
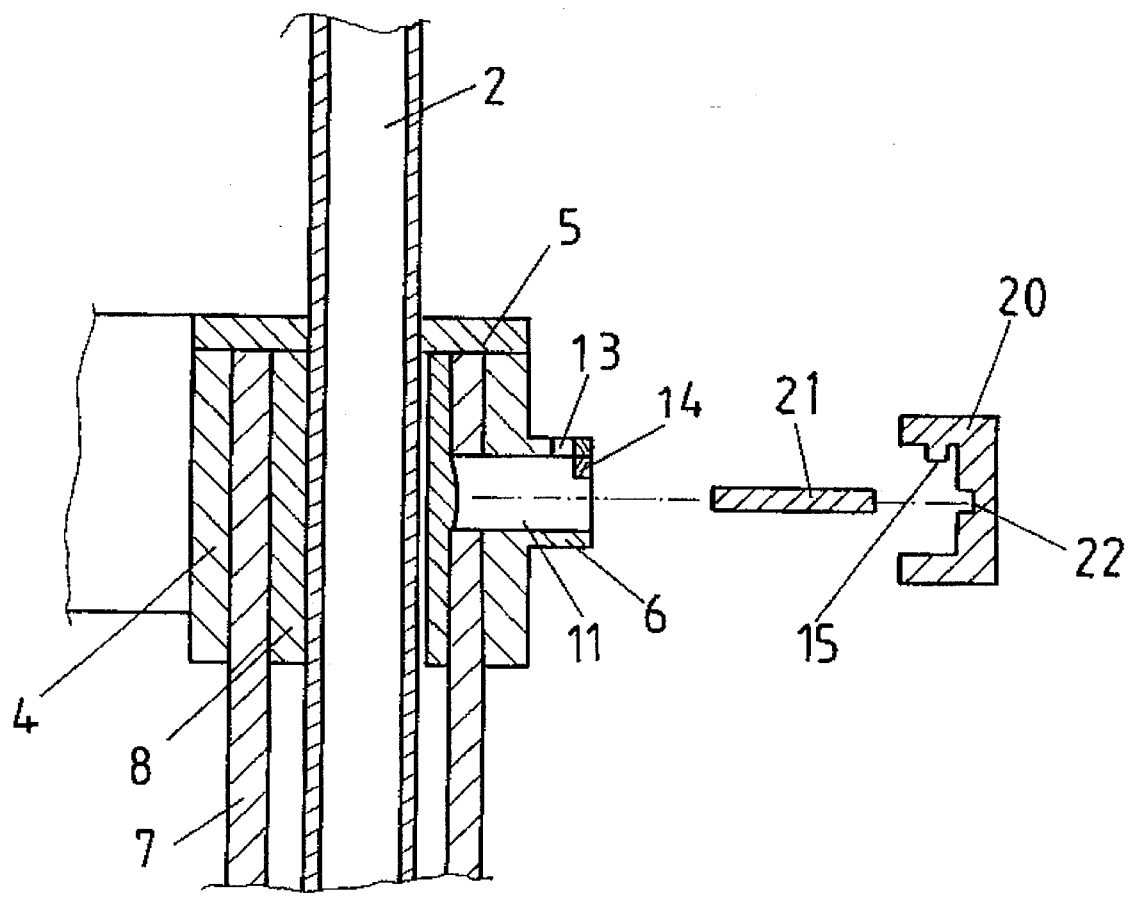
FIG. 5 is a partially exploded, cross-sectional view of a second embodiment showing the action of the present invention to control the screw bush.
Figure 6:
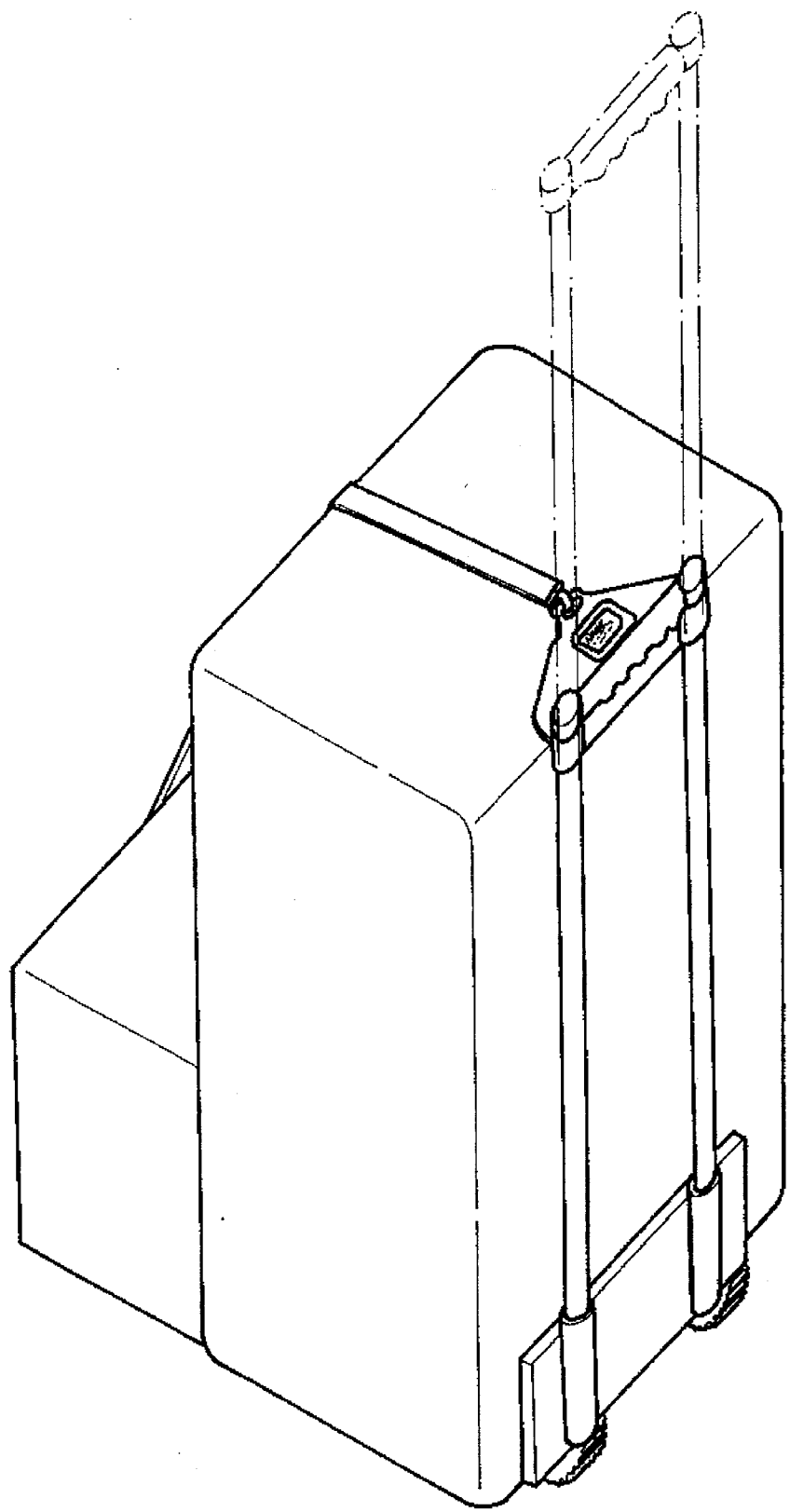
FIG. 6 is a perspective view of the present invention incorporated into a suitcase body.

Referring to FIGS. 5 and 6, a control screw bush 20 may also be mounted by means of a setting assembly. A screw block 15 is located on the inner bushing edge, and a central portion is provided with an insert slot or recess 22 and includes a forced lever or pin 21. Pin 21 has one end mounted into the insert slot 22 to make firm insertion and the whole assembly is received in the control screw bush 20. Based on the aforesaid action and structural principle, screw the control screw bush 20 into the screw block seat 6 to cause the thread block 15 to be inserted in the retaining slot 13. Slot 13 in association with locking block 14 will keep control screw bush 20 from slipping out and from falling off. Forced lever 21 pushes spring 9 inwardly to maintain it in firm place against drag link 2 when control screw bush 3 is moved inwardly. Drag link 2 thus may become extensible and positioned at random and can be used in combination with a suitcase as shown in FIG. 6.

I claim:

1. A secure screw knob drag link movable positioning structure comprising:

a mounting coupling having an internal bore therethrough, a first end and a second end with an outer annular surface, said coupling further having a radial bore therethrough which is in communication with said internal bore;

a first hollow tubular member extending coaxially with said coupling internal bore in a first direction from said first end;

an insert located in said coupling bore and comprised of:
   an elongate shaft having first and second ends and a midportion and having an internal axial bore therethrough, said shaft further having an axially extending notch therein extending from said first end thereof and terminating in said shaft midportion, said notch producing an axially extending spring portion, and an annular flange mounted at said second end of said shaft and having a size such that said flange engages said coupling annular surface and prevents further axial movement of said insert inside said coupling, at least a part of said spring portion being located in registration with said coupling radial bore;

a second hollow tubular member telescopingly, slidably movable in said coupling, said insert and said first tubular member;

a radially extending threaded hub rigidly mounted on said coupling over said radial bore, said hub having a bore therethrough in alignment with said coupling radial bore and having a terminal outer portion, said outer portion comprised of a locking block defined by a retaining slot extending in the radial direction with respect to said hub bore and a notch in said locking block which extends from said slot in the axial direction with respect to said hub bore to the end of said hub bore; and a knob mountable on said hub and having a wall, an end portion, an internal threaded bore, a tab mounted on said knob wall and extending radially into said knob bore for engaging with said threaded hub, and a pin mounted at one end thereof inside said knob bore to said knob end portion such that when said knob is screwed on said hub, said pin can engage said spring portion and in turn can force said spring portion to lockingly engage said second tubular member, and such that when said knob is unscrewed on said hub said tab engages said locking block which prevents said knob from being unscrewed further.

2. The positioning structure as claimed in claim 1 wherein said knob end portion has a recess therein such that said pin can be inserted into and retained in said recess.

3. The positioning structure as claimed in claim 1 wherein said pin is integral with said knob end portion.

4. The positioning structure as claimed in claim 1 and further including a cross bar, said coupling being mounted at one end of said cross bar and a further coupling being mounted at the other end of said cross bar and a further first and a further second hollow tubular members, a further insert located in said further coupling, a further hub mounted on said further coupling, and a further knob mountable on said further hub.

5. The positioning structure as claimed in claim 1 wherein said knob internal bore has a size such that said knob can fit around the outside of said hub.

\* \* \* \* \*